US011425733B2

(12) United States Patent
Nguyen et al.

(10) Patent No.: US 11,425,733 B2
(45) Date of Patent: Aug. 23, 2022

(54) PACKET PRIORITY HANDLING IN DEVICE-TO-DEVICE COMMUNICATION

(71) Applicant: QUALCOMM Incorporated, San Diego, CA (US)

(72) Inventors: Tien Viet Nguyen, Bridgewater, NJ (US); Junyi Li, Chester, NJ (US); Sudhir Kumar Baghel, Hillsborough, NJ (US); Hong Cheng, Bridgewater, NJ (US); Shailesh Patil, San Diego, CA (US); Kapil Gulati, Hillsborough, NJ (US); Arjun Bharadwaj, Cupertino, CA (US); Shuanshuan Wu, San Diego, CA (US); Zhibin Wu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 16/592,658

(22) Filed: Oct. 3, 2019

(65) Prior Publication Data

US 2020/0112972 A1 Apr. 9, 2020

Related U.S. Application Data

(60) Provisional application No. 62/742,128, filed on Oct. 5, 2018.

(51) Int. Cl.
*H04W 72/10* (2009.01)
*H04W 72/04* (2009.01)
(Continued)

(52) U.S. Cl.
CPC ........... *H04W 72/10* (2013.01); *H04L 5/0007* (2013.01); *H04L 5/0082* (2013.01); *H04W 28/26* (2013.01); *H04W 72/0446* (2013.01)

(58) Field of Classification Search
CPC . H04W 72/10; H04W 72/0446; H04W 28/26; H04W 74/0808; H04W 72/1242;
(Continued)

(56) References Cited

U.S. PATENT DOCUMENTS

2017/0318595 A1  11/2017 Dinan et al.
2018/0027418 A1*  1/2018 Li .......................... H04W 72/04
                                                    370/329
(Continued)

FOREIGN PATENT DOCUMENTS

WO     2017026973 A1    2/2017
WO     2018006313 A1    1/2018

OTHER PUBLICATIONS

Intel Corporation, "Sidelink REsource Allocation Mechanisms for NR V2X Communication", 3GPP TSG RAN WG1 Meeting #94bis, R1-1810775 (Year: 2018).*

(Continued)

*Primary Examiner* — Walter J DiVito
(74) *Attorney, Agent, or Firm* — Harrity & Harrity, LLP/Qualcomm Incorporated

(57) ABSTRACT

Various aspects of the present disclosure generally relate to wireless communication. In some aspects, a transmitter device may receive, for communication in a network, information identifying a channel access frame structure, wherein the channel access frame structure is associated with a plurality of transmission time intervals (TTIs) grouped into a single frame, and wherein resources of the plurality of TTIs are allocated for transmission of reservation signal based at least in part on prioritization information. The transmitter device may transmit, to a receiver device, a reservation signal using a resource of the plurality of TTIs to indicate use of a subsequent resource for a subsequent transmission based at least in part on the channel access (Continued)

frame structure and a prioritization of the subsequent transmission. Numerous other aspects are provided.

37 Claims, 8 Drawing Sheets

(51) Int. Cl.
*H04L 5/00* (2006.01)
*H04W 28/26* (2009.01)

(58) Field of Classification Search
CPC ..... H04L 5/0007; H04L 5/0082; H04L 5/001; H04L 5/0098; H04L 5/0037; H04L 5/0053; H04L 5/0064
See application file for complete search history.

(56) References Cited

U.S. PATENT DOCUMENTS

2018/0206260 A1* 7/2018 Khoryaev ......... H04W 72/1263
2019/0313375 A1* 10/2019 Loehr .................. H04W 72/04

OTHER PUBLICATIONS

3GPP TS 38.300: "3rd Generation Partnership Project; Technical Specification Group Radio Access Network; NR; NR and NG-RAN Overall Description; Stage 2 (Release 15)", 3GPP Standard; Technical Specification; 3GPP TS 38.300 V15.0.0 (Dec. 2017), 3rd Generation Partnership Project (3GPP), Mobile Competence Centre; 650, Route Des Lucioles; F-06921 Sophia-Antipolis Cedex; France, vol. RAN WG2, No. V15.0.0, (Dec. 2017), Jan. 4, 2018, pp. 1-68, XP051392360, paragraph 9.2.3, Figure 9.2.3.1-1, Figure 9.2.3 . . . 2.1-1, paragraph 16.1.1, paragraph 16.1.3.
International Search Report and Written Opinion—PCT/US2019/054621—ISA/EPO—dated Dec. 19, 2019.

* cited by examiner

PACKET PRIORITY HANDLING IN DEVICE-TO-DEVICE COMMUNICATION

CROSS-REFERENCE TO RELATED APPLICATIONS

This application claims priority to U.S. Provisional Patent Application No. 62/742,128, filed on Oct. 5, 2018, entitled "PACKET PRIORITY HANDLING IN DEVICE-TO-DEVICE COMMUNICATION," which is hereby expressly incorporated by reference herein.

INTRODUCTION

Aspects of the present disclosure generally relate to wireless communication, and to techniques and apparatuses for packet priority handling in device-to-device communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method may include receiving, for communication in a network, information identifying a plurality of resources associated with prioritization information in a channel access frame structure. The method may include transmitting, to a receiver device, a reservation signal using a resource, of the plurality of resources, to indicate use of a subsequent resource for a subsequent transmission based at least in part on the channel access frame structure and a prioritization of the subsequent transmission. Other aspects may include transmitter devices, non-transitory computer-readable media, apparatuses, and/or or the like.

Aspects generally include a method, apparatus, system, computer program product, non-transitory computer-readable medium, user equipment, base station, wireless communication device, transmitter device, receiver device, and/or or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
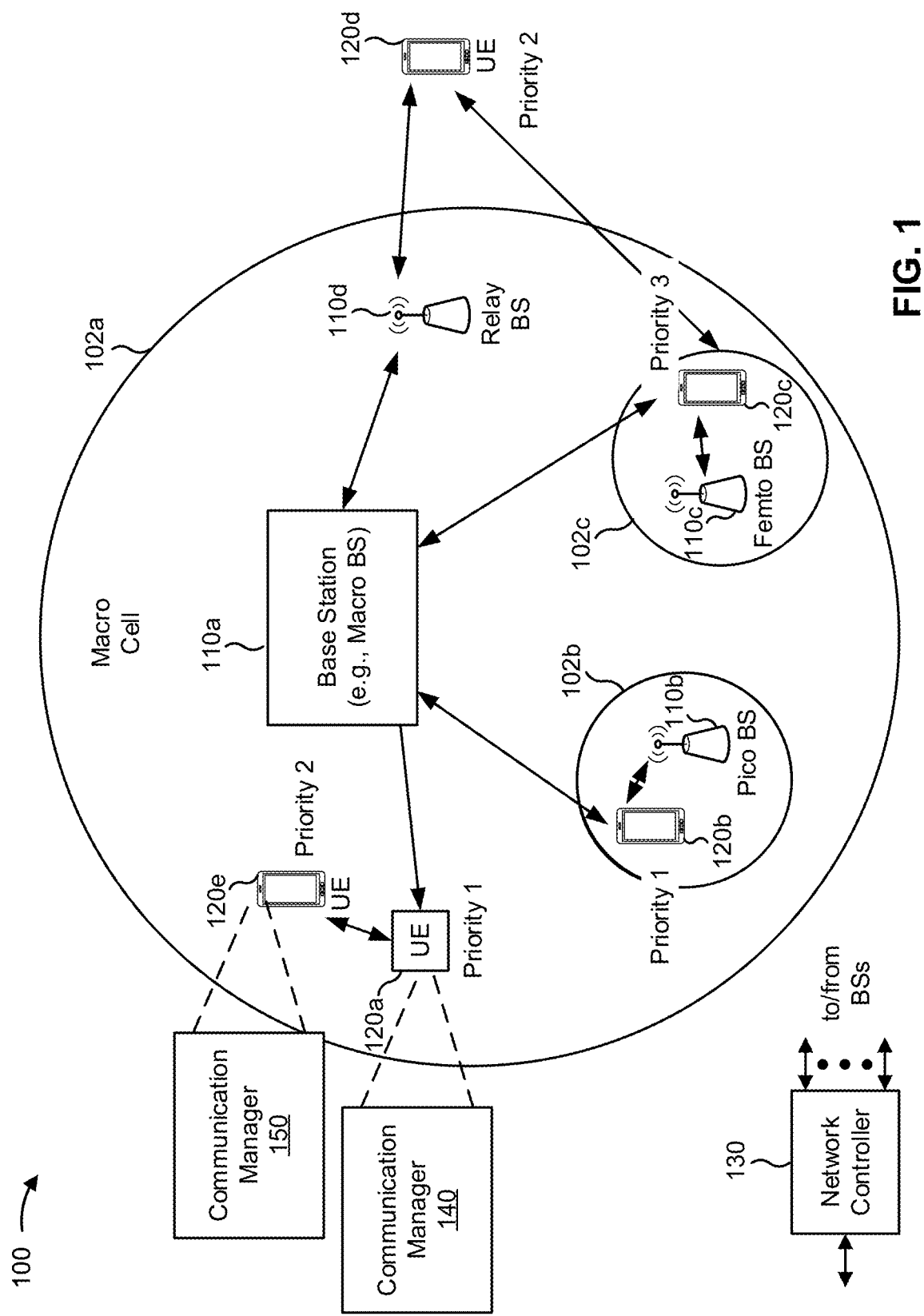
FIG. 1 is a block diagram conceptually illustrating an example of a wireless communication network, in accordance with various aspects of the present disclosure.

In some communications systems, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh communications, peer-to-peer (P2P) communications, and/or various other suitable applications. Generally, a sidelink signal may refer to a signal communicated from one subordinate entity to another subordinate entity without relaying that communication through a scheduling entity (e.g., a UE or a BS), even though, in one example, the scheduling entity may be utilized for scheduling and/or control purposes. Although some aspects described herein are described in terms of a UE being a subordinate entity, other configurations are possible, such as a BS being a subordinate entity.

In some communications systems, spectrum sharing may be used to share spectrum between different operators, cells, transmitter devices, and/or the like. Some operators may use a contention-based approach to share spectrum. For example, a first transmitter device that wishes to communicate with a receiver device in shared spectrum may perform a contention-based approach, such as by using a reservation signal, a listen-before-talk (LBT) procedure, and/or the like, in order to secure resources for communication and avoid interference associated with transmissions from a second transmitter device. In contention-based process, the first transmitter device may transmit a reservation signal and the second transmitter device may attempt to receive the reservation signal. Based at least in part on the second transmitter device receiving the reservation signal, the second transmitter device may avoid transmitting on resources reserved in connection with the reservation signal. Based at least in part on the second transmitter device not receiving the reservation signal, the second transmitter device may determine that the first transmitter device is not to transmit, and the second transmitter device may transmit a reservation signal to reserve the resources for a subsequent transmission.

In some communications systems, there may be different types of transmitter devices and/or different types of traffic associated with different prioritizations and/or different delay requirements.

Some aspects described herein may enable priority and delay management in contention-based communication. For example, some aspects described herein may enable priority-based access procedures that enable low-latency requirements to be satisfied when operating in a contention-based communication system, such as for device-to-device (D2D) communications, sidelink communications, peer-to-peer (P2P) communications, and/or the like. In some aspects, a transmitter device, such as a UE, may receive information identifying a channel access frame structure that includes a plurality of transmission time intervals (TTIs) grouped into a single frame, and may transmit using a resource of the plurality of TTIs. In this case, the channel access frame structure may include different resources reserved for different priority classes to enable use of a prioritization in contention-based communications.

Further, based at least in part on grouping the plurality of TTIs into a single frame (e.g., a single contention interval), a quantity of priority classes may be increased relative to including a single TTI in each frame. Further, based at least in part on grouping the plurality of TTIs into a single frame, a reoccurrence of resources of the plurality of TTIs (e.g., transmission opportunities) allocated to particular classes of transmitter devices may be allocated to enable low-latency requirements to be satisfied. In this way, the transmitter device may enable priority-based reservation signal transmission and satisfy low-latency requirements, thereby improving network performance. Further, each transmission opportunity may enable a transmitter device to transmit a reservation signal at a particular resource block at a particular OFDM symbol, and a scheduling of resource blocks and reoccurrences of transmission opportunities may be flexibly configured to accommodate different types of traffic.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a g Node B (gNB), a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may be coupled to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. Each UE 120 may be associated with a priority for prioritizing UE 120 to UE 120 communication (e.g., sidelink communication, peer-to-peer communication, and/or the like) in connection with a contention-based channel access procedure (e.g., a reservation signaling procedure, an LBT procedure, and/or the like). A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). Some UEs may communicate with other UEs using device-to-device communications (e.g., sidelink communications or peer-to-peer communications), and may reserve resources for the device-to-device communications using a reservation signal. UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 (e.g., UE 120a) may include a communication manager 140. As described in more detail elsewhere herein, the communication manager 140 may receive, for communication in a network, information identifying a channel access frame structure, wherein the channel access frame structure is associated with a plurality of transmission time intervals (TTIs) grouped into a single frame, and wherein resources of the plurality of TTIs are allocated for transmission of reservation signals based at least in part on prioritization information; transmit, to a receiver device, a reservation signal using a resource of the plurality of TTIs to indicate use of a subsequent resource for a subsequent transmission based at least in part on the channel access frame structure and a prioritization of the subsequent transmission; and/or the like. Additionally, or alternatively, the communication manager 140 may perform one or more other operations described herein.

As shown in FIG. 1, the UE 120 (e.g., UE 120e) may include a communication manager 150. As described in more detail elsewhere herein, the communication manager 150 may receive a reservation signal using a resource of the plurality of TTIs to indicate use of a subsequent resource for a subsequent transmission based at least in part on the channel access frame structure and a prioritization of the subsequent transmission; and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
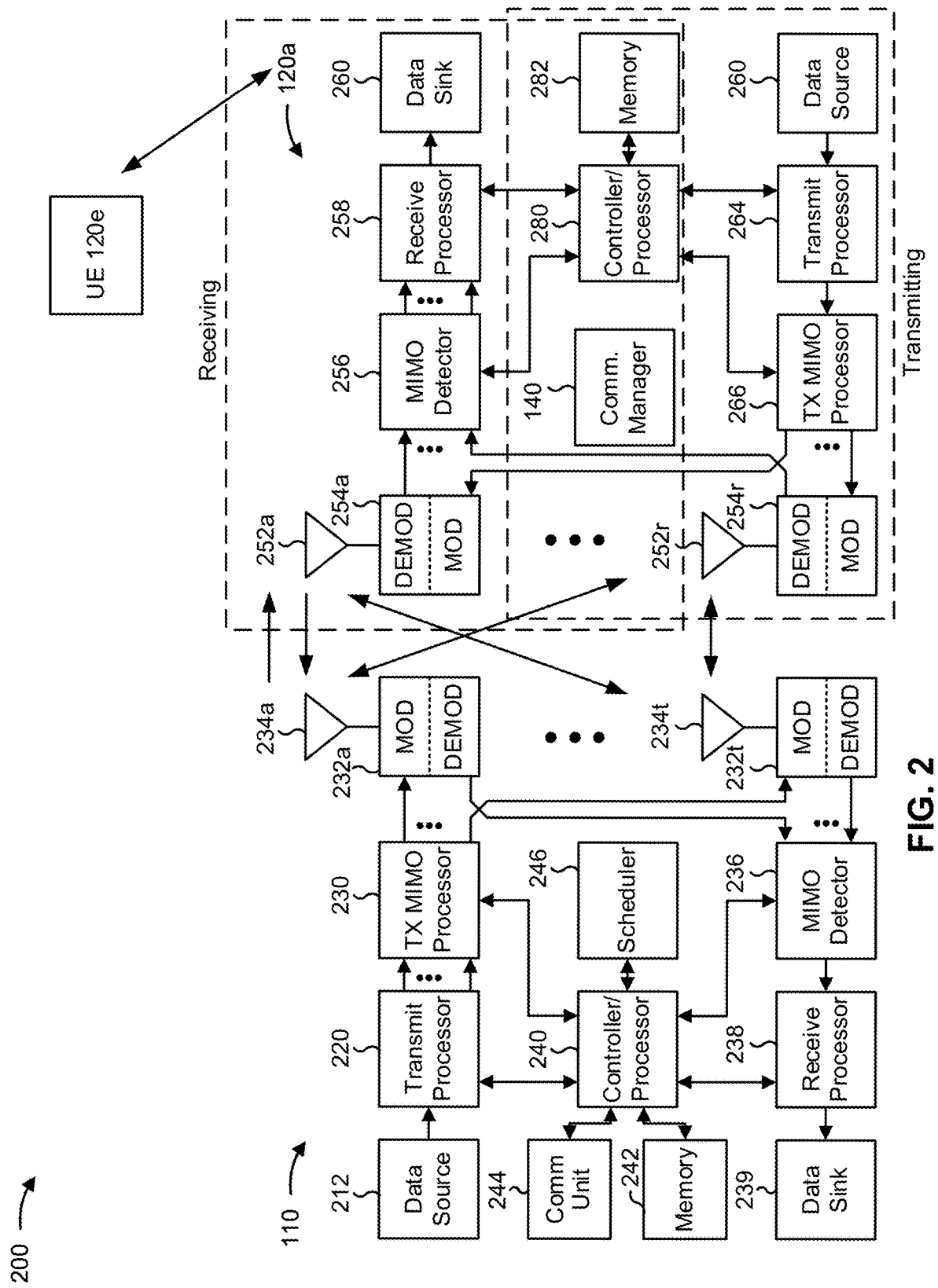
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120 (e.g., UE 120a), antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120 (e.g., UE 120a), a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs (e.g., UE 120e) may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to a network controller via communication unit 244. UE 120 may communicate with another UE 120, such as in sidelink communication, peer-to-peer communication, and/or the like.

Controller/processor 240 of base station 110, controller/processor 280 of UE 120, and/or any other component(s) of FIG. 2 may perform one or more techniques associated with reservation signal management, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, a transmitter device, such as the UE 120a, may include means for receiving, for communication in a network, information identifying a plurality of resources associated with prioritization information in a channel access frame structure; means for transmitting, to a receiver device (e.g., UE 120e and the communication manager 150), a reservation signal using a resource, of the plurality of resources, to indicate use of a subsequent resource for a subsequent transmission based at least in part on the channel access frame structure and a prioritization of the subsequent transmission, and/or the like. Additionally, or alternatively, the transmitter device (e.g., the UE 120) may include means for performing one or more other operations described herein. In some aspects, such means may include the communication manager 140. Additionally, or alternatively, such means may include one or more components of the UE 120 described in connection with FIG. 2.

As indicated above, FIG. 2 is provided merely as an example. Other examples may differ from what is described with regard to FIG. 2.

FIGS. 3A-3D are diagrams illustrating example frame structures for a reservation signal-based contention-based access procedure, in accordance with various aspects of the present disclosure.

Figure 3A:
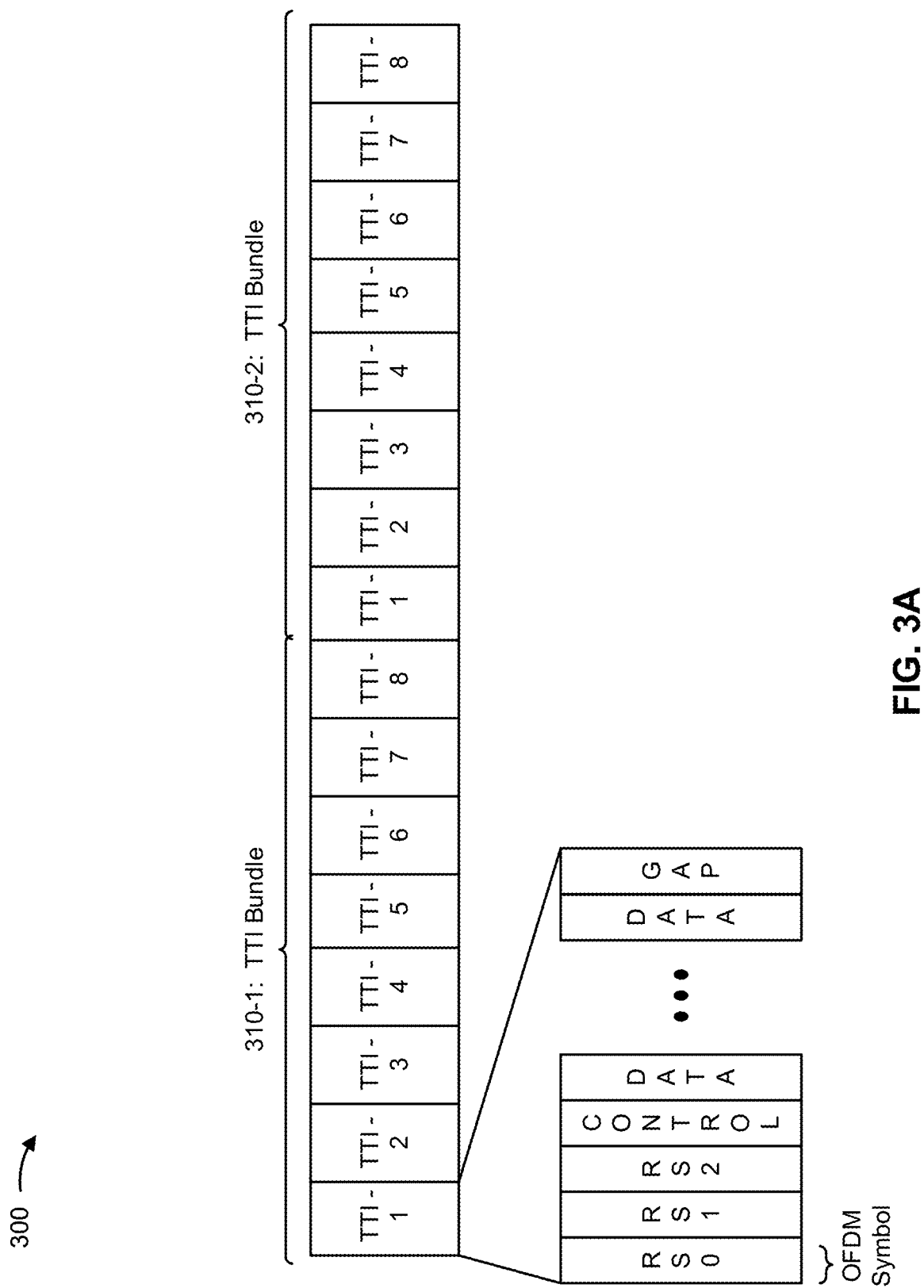
FIGS. 3A-3D are diagrams illustrating examples of a channel access frame structure for a reservation signal contention-based access procedure, in accordance with various aspects of the present disclosure.

As shown in FIG. 3A, example 300 of a channel access frame structure shows a set of TTI bundles 310-1 and 310-2.

As shown, each TTI bundle 310 includes a set of TTIs (e.g., TTIs 1 through 8) that are grouped together into a single frame. In this case, to reserve a communication resource, a UE may select a particular orthogonal frequency division multiplexing (OFDM) symbol associated with particular TTI of a frame and may transmit a reservation signal using the particular OFDM symbol. For example, with regard to a single TTI in a frame, the UE may select a counter value 0 or a counter value 1 based at least in part on a selection procedure (e.g., a random selection procedure, a pseudo random selection procedure, and/or the like), and may select an OFDM symbol corresponding to the counter value, as described herein.

In this case, when the UE selects counter value 0, the UE may attempt to transmit a reservation signal at a first OFDM symbol (e.g., in RS0 of TTI-1). When the UE selects counter value 1, the UE may attempt to transmit a reservation signal at a third OFDM symbol (e.g., in RS2 of TTI-2). In this case, based at least in part on omitting the second OFDM symbol from being used for reservation signal transmission, the channel access frame structure enables a UE to switch from listening on the first OFDM symbol to transmitting on the third OFDM symbol, and enables a UE selecting counter value 1 (e.g., listening on the first OFDM symbol) to detect another UE transmitting on the first OFDM symbol and determine that the other UE is reserving communication resources associated with the TTI.

In contrast, based at least in part on grouping N TTIs into a frame, a UE may select counter values from 0 to 2N−1. For example, based at least in part on grouping 8 TTIs into a frame, a UE may select a counter value from 0 to 15. Each counter value may correspond to a counter value 0 or a counter value 1 in a particular TTI, such that counter value 2i is a first OFDM symbol in an (i+1)th TTI and counter value 2i+1 is a third OFDM symbol in the (i+1)th TTI. For example, when a UE selects counter value 7, the UE may determine to transmit a reservation signal in the third OFDM symbol of TTI-3. In this case, as described in more detail herein, different priority classes may be assigned different sets of counter values. For example, a first set of UEs in a first priority class may select from counter values 0-3, a second UE in a second priority class may select from counter values 4-9, and/or the like, thereby supporting up to 2N classes.

In some aspects, the priority classes may relate to a type of UE (e.g., a traffic sensor type of UE may be associated with a first priority class and an emergency services type of UE may be associated with a second priority class). Additionally, or alternatively, the priority classes may relate to a type of traffic. For example, traffic that is associated with high-reliability or low-latency applications may be associated with a first priority class and traffic that is associated with low-reliability or high-latency applications may be associated with a second priority class. Additionally, or alternatively, the priority classes may relate to a level of traffic. For example, high-traffic UEs may be associated with a first priority class and low-traffic UEs may be associated with a second priority class.

In some aspects, a quantity of counter values assigned to a particular priority class may be based at least in part on a quantity of UEs in the particular priority class, a quantity of packets for transmission associated with the particular priority class, and/or the like. For example, a first, highest priority class may be assigned counter values 0-1 for a set of 3 UEs, a second, middle priority class may be assigned counter values 2-10 for a set of 12 UEs, and a third, lowest priority class may be assigned counter values 11-15 for a set of 7 UEs. In this way, a likelihood that a plurality of UEs of a common priority class select a same OFDM symbol on which to attempt to reserve communication resources, and as a result fail to reserve communication resources, is reduced. Moreover, based at least in part on subdividing counter values for different priority classes, the UEs may identify a priority of other UEs attempting to reserve resources for subsequent transmissions, and may allow a highest priority class UE to reserve the resources for subsequent transmissions. In this way, a channel access frame structure with a plurality of TTIs grouped to form a single frame enables use of a plurality of classes of prioritization (e.g., three or more classes of prioritization), thereby improving network performance relative to a channel access frame structure with a single TTI.

Figure 3B:
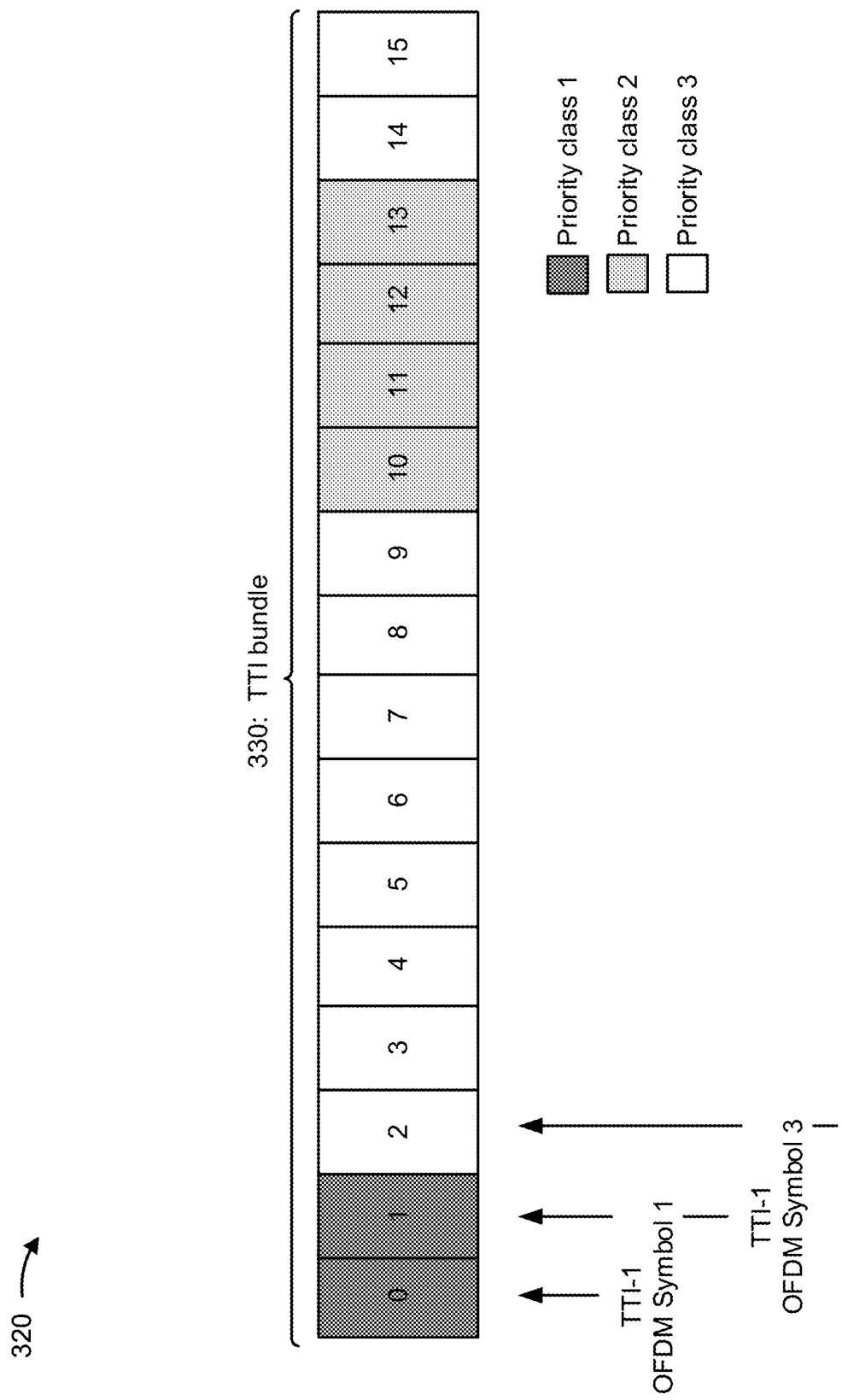

As shown in FIG. 3B, an example 320 of a channel access frame structure shows an allocation of counter values for a TTI bundle 330. As shown, TTI bundle 330 includes a set of 8 TTIs each including 2 OFDM symbols for transmitting a reservation signal (e.g., a first OFDM symbol and a third OFDM symbol of a reservation signaling opportunity, such as an LBT opportunity). In this case, a first set of counter values (e.g., counter values 0-1) are reserved for a first priority class, a second set of counter values (e.g., counter values 10-13) are reserved for a second priority class, and (e.g., counter values 2-9 and 14-15) are reserved for a third priority class. In this case, such a reservation of counter values may be applied in a case where second priority class traffic is expected to be 2 times more than first priority class traffic, and third class traffic is expected to be 5 times more than first class priority traffic (e.g., a quantity of counter values of the second class is 2 times more than for the first class, and a quantity of counter values of the third class is 5 times more than for the first class).

In this case, when a UE of the first priority class transmits a reservation signal associated with counter value 0 or 1, each UE of the second priority class and the third priority class will not be transmitting, and may detect the reservation signal, enabling the first UE to reserve communication resources. Similarly, when a first UE of the third priority class attempts to transmit a reservation signal, a second UE of the third priority class may detect the reservation signal if there is no collision (e.g., if the second UE does not randomly select the same counter value as the first UE). In this case, based at least in part on selecting a quantity of counter values for a priority class based at least in part on a quantity of UEs and/or traffic associated with the priority class, a likelihood of a collision between UEs of the priority class may be reduced.

Figure 3C:
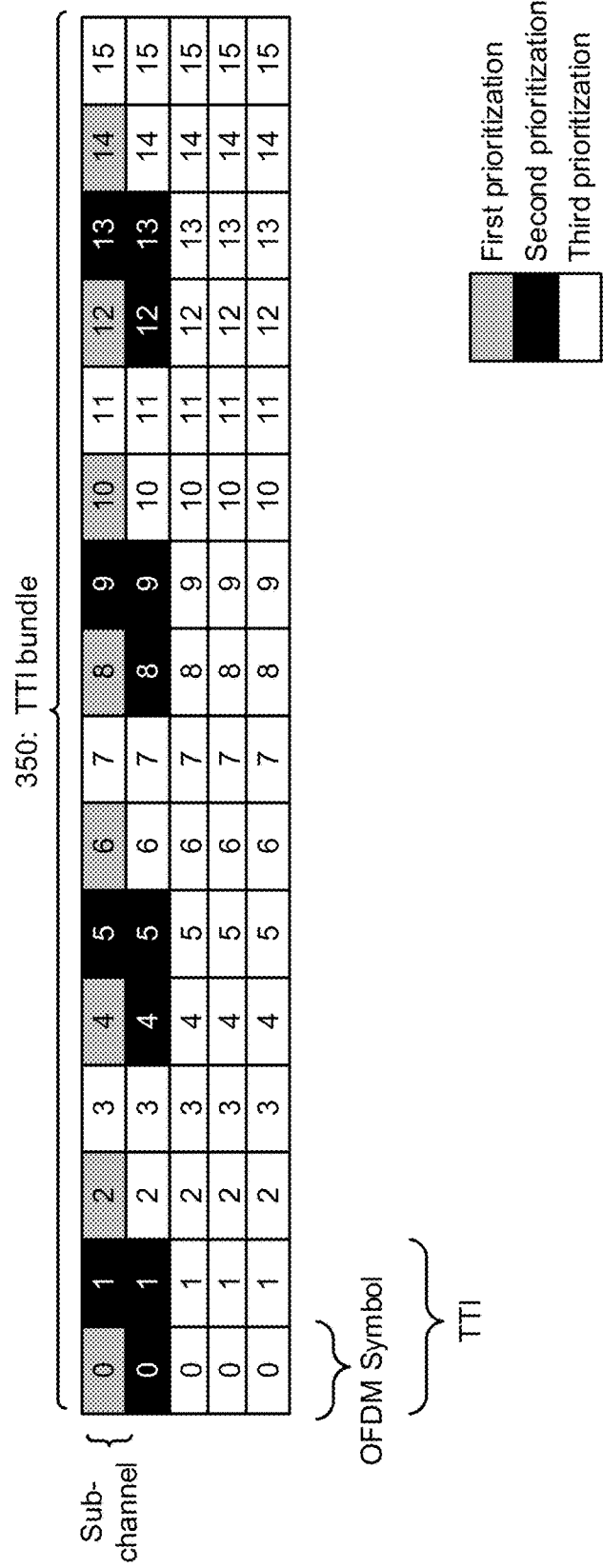

As shown in FIG. 3C, example 340 of a channel access frame structure shows an allocation of counter values of a TTI bundle 350. As shown, TTI bundle 350 includes a set of 8 TTIs each including 2 OFDM symbols for transmitting a reservation signal (e.g., a first OFDM symbol and a third OFDM symbol of a TTI). In this case, a set of 5 sub-channels are available for transmitting an OFDM symbol. Thus, in TTI bundle 350, 80 OFDM symbols may be allocated for transmission of reservation signals.

As shown, in a first sub-channel, a first priority class is reserved counter values 0, 2, 4, . . . , 14; a second priority class is reserved counter values 1, 5, 9, 13; and a third priority class is reserved counter values 3, 7, 11, 15. Similarly, in a second sub-channel, the first priority class is not reserved counter values; the second priority class is reserved counter values 0-1, 4-5, 8-9, 12-13; and the third priority class is reserved counter values 2-3, 6-7, 10-11, 14-15.

Similarly, in a third sub-channel, a fourth sub-channel and a fifth sub-channel, the third priority class is reserved counter values 0-15.

In this case, for 0.5 millisecond (ms) TTIs with a 30 kilohertz (kHz) subchannel spacing (SCS), resources in the first sub-channel for the first priority class reoccur every 1 TTI resulting in a delay of 0.5 ms. Based at least in part on UEs of the first priority class being assigned to select counter values 0, 2, 4, . . . , 14, the delay of 0.5 ms and the quantity of counter values may enable infrequent transmission with a strict delay requirement (e.g., a 1 ms delay requirement) for low-latency communication. In contrast, for the second priority class, resources reoccur in the first sub-channel and the second sub-channel every 2 TTIs for a 1 ms delay. UEs of the second priority class may be assigned to pick counter values 0, 1, 4, 5, . . . , 12, 13, but, when counter 0 is selected, a UE may be caused to use the second sub-channel rather than the first sub-channel to avoid a collision with a reservation signal transmission by UEs of the first priority class. This may enable more frequent transmission with a less strict delay requirement (e.g., a 2 ms delay requirement) than for the first priority class. Similarly, the third priority class resources may reoccur each TTI for a 0.5 ms delay, and UEs may be assigned to pick counter values 0-15, such that if a counter is selected that is occupied by another priority class (e.g., counter values 0-3, 5-7, and/or the like) UEs may transmit reservation signals on, for example, the third sub-channel rather than, for example, the first sub-channel.

Figure 3D:
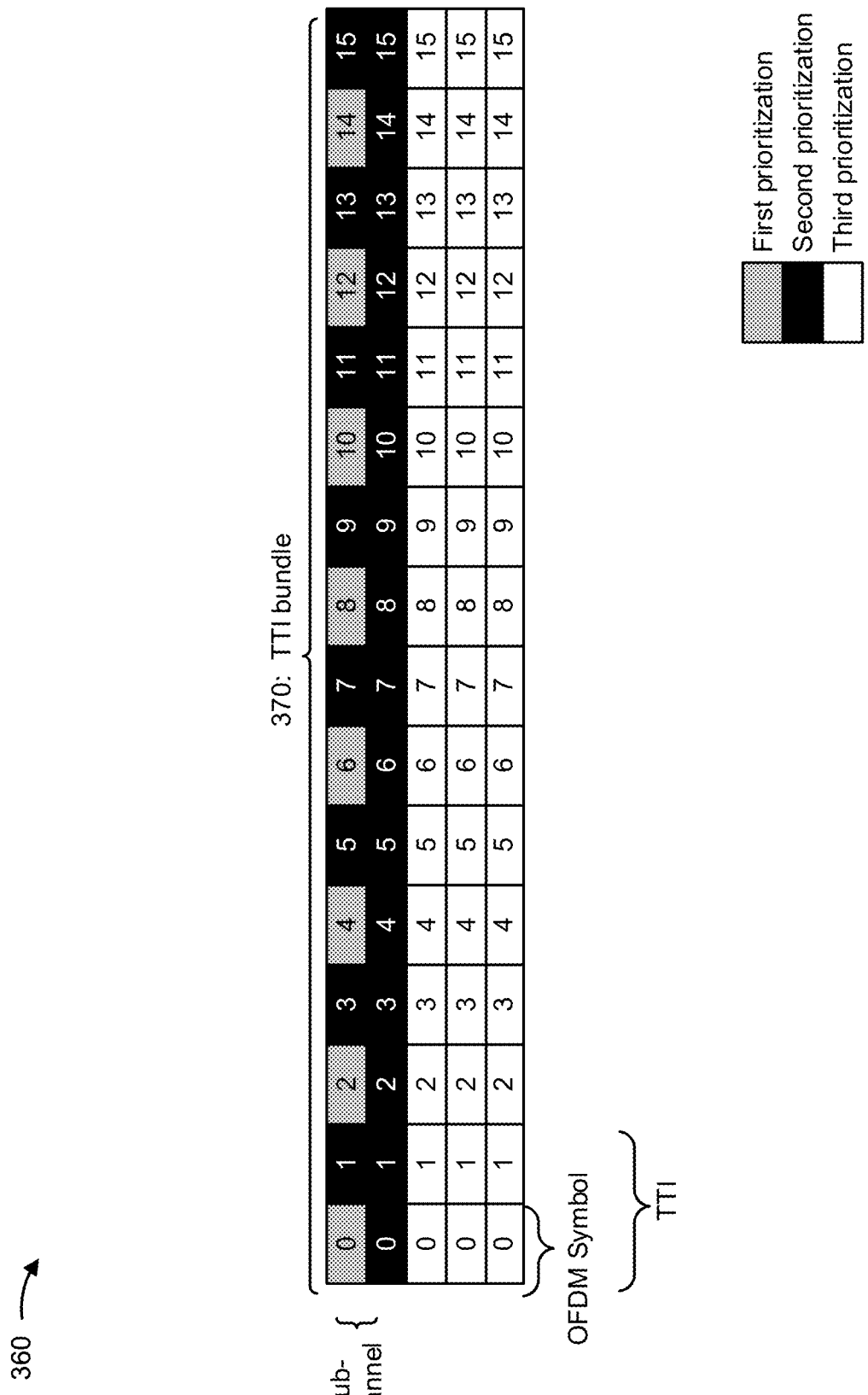

As shown in FIG. 3D, example 360 of a channel access frame structure shows a set of TTI bundle 370. As shown, a TTI bundle 370 includes a set of 8 TTIs each including 2 OFDM symbols for transmitting a reservation signal (e.g., a first OFDM symbol and a third OFDM symbol in each TTI). As shown, in a first sub-channel, a first priority class is reserved counter values 0, 2, 4, . . . , 14 and a second priority class is reserved counter values 1, 3, 5, . . . , 15. Similarly, in a second sub-channel, the first priority class is not reserved counters and the second priority class is reserved counter values 0-15. Similarly, in a third sub-channel (and in a fourth sub-channel and a fifth sub-channel) the third priority class is reserved counter values 0-15. In this case, for example, the second priority class may serve packets with a 1 ms delay with resources reoccurring every TTI, and UEs of the second priority class being configured to select counter values 0-15, such that when the UEs select counter values 0, 2, 4, etc. the UEs are to transmit a reservation signal on the second sub-channel rather than the first sub-channel to avoid a collision with the first priority class.

In this way, a delay requirement for low-latency communication may be satisfied by enabling more frequent reoccurrence of resources for transmitting a reservation signal to more frequently communicate relative to a channel access frame structure that does not include sub-channels.

Although some aspects described herein are described in terms of a particular set of channel access frame structures, other frame structures may be used.

As indicated above, FIGS. 3A-3D are provided as examples. Other examples may differ from what is described with respect to FIGS. 3A-3D.

Figure 4:
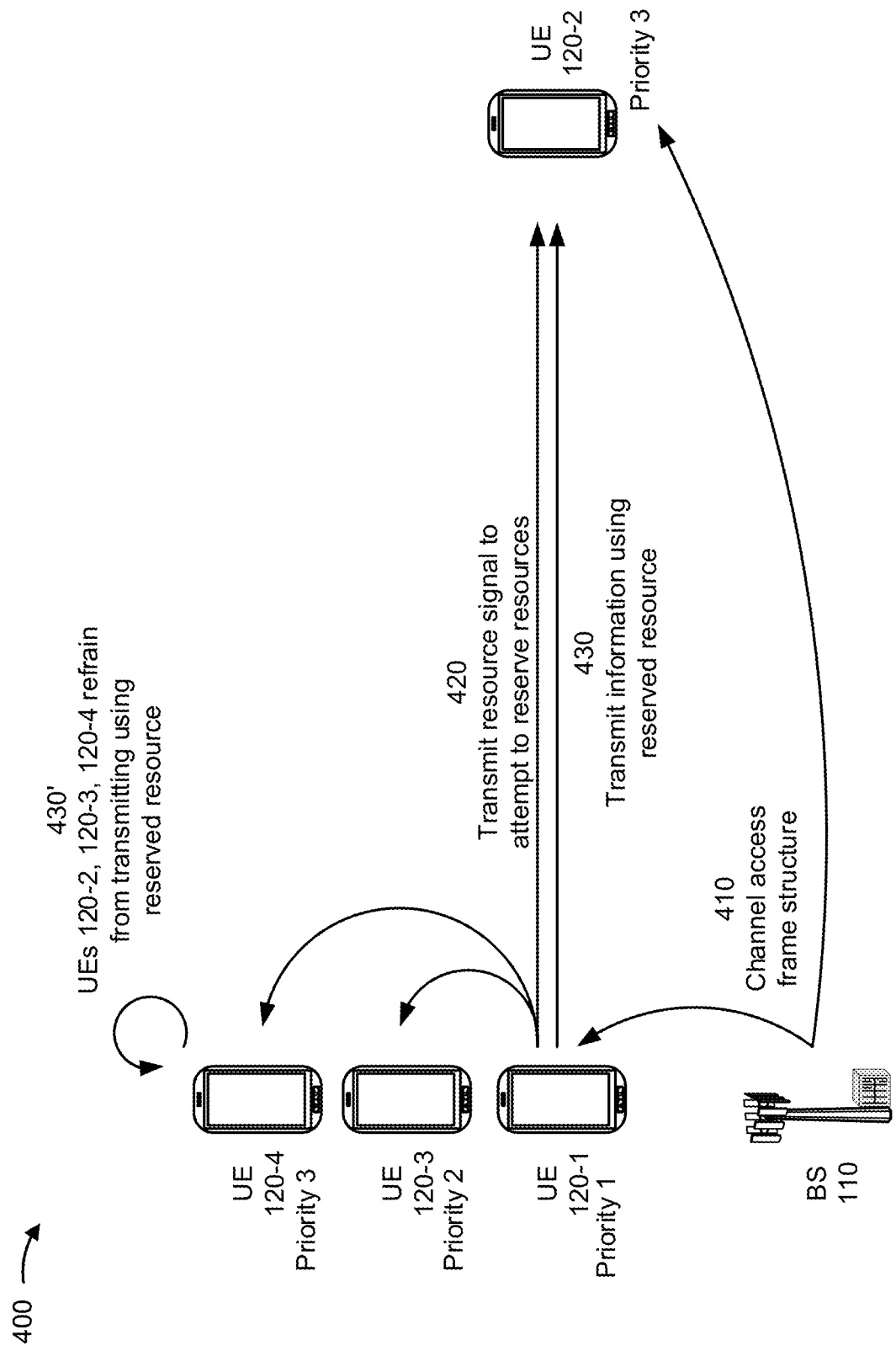
FIG. 4 is a diagram illustrating an example of priority management in connection with a channel access frame structure, in accordance with various aspects of the present disclosure.

FIG. 4 is a diagram illustrating an example 400 of reservation signal management, in accordance with various aspects of the present disclosure. As shown in FIG. 4, example 400 includes a BS 110, a UE 120-1, a UE 120-2, a UE 120-3, and a UE 120-4. In this case, BS 110 may be a scheduling entity, UEs 120-1, 120-3, and 120-4 may be transmitter devices, and UE 120-2 may be a receiver device. In some aspects, UE 120-1 may be associated with a first, highest priority class, UE 120-2 and UE 120-4 may be associated with a third, lowest priority class, and UE 120-3 may be associated with a second, middle priority class.

As further shown in FIG. 4, and by reference number 410, UEs 120-1 through 120-4 may receive information identifying a channel access frame structure. For example, UE 120-1 may receive an indicator of the channel access frame structure, as described in more detail above, from BS 110. In some aspects, the channel access frame structure may include a set of bundled TTIs in a single frame. For example, BS 110 may indicate a channel access frame structure that UEs 120 are to use for sidelink communications, which may include a plurality of TTIs grouped into a single frame. In some aspects, a reservation of opportunities for transmitting a reservation signal may be based at least in part on a prioritization of UEs 120. For example, UE 120-1 may determine that UE 120-1 is to select, based at least in part on a priority class of UE 120-1, a subset of counter values for identifying an OFDM symbol in which to transmit a reservation signal. Additionally, or alternatively, the channel access frame structure may include a plurality of sub-channels with a reservation of opportunities for transmitting a reservation signal based at least in part on a prioritization of the UEs 120. For example, UE 120-1 may determine that a first subset of counter values may be selected for a first sub-channel, a second subset of counter values may be selected for a second sub-channel, and/or the like.

In some aspects, an OFDM symbol may include one or more frequency tones, where a resource block is a group of 12 consecutive tones. For example, when subcarrier spacing is 15 kHz, there are 600 tones in an OFDM symbol, equivalent to 50 resource blocks; if subcarrier spacing is 30 kHz, there are 300 tones, equivalent to 25 resource blocks.

As further shown in FIG. 4, and by reference number 420, UE 120-1 may transmit a reservation signal to attempt to reserve resources for a subsequent transmission. For example, UE 120-1 may select a counter value (e.g., using a random selection procedure), as described in more detail above, and may transmit the reservation signal at an OFDM symbol of the channel access frame structure corresponding to the counter value. In some aspects, UE 120-1 may select the counter value based at least in part on a priority class of UE 120-1, a delay requirement of UE 120-1, and/or the like. In this case, based at least in part on UE 120-1 having a highest priority class, UE 120-1 may select a counter value before counter values selected by other UEs 120, and may reserve the resources.

In some aspects, UE 120-1 may attempt to receive a reservation signal. For example, UE 120-1 may attempt to receive the reservation signal at a first OFDM symbol of the channel access frame structure and, based at least in part on not detecting the reservation signal (e.g., based at least in part on UE 120-2 or another UE not reserving communication resources by transmitting a reservation signal), UE 120-1 may transmit the reservation signal to reserve resources for communication. Although some aspects described herein are described in terms of UE 120-1 and UE 120-2, other UEs may be operating in a same cell as UE 120-1 and UE 120-2.

As further shown in FIG. 4, and by reference number 430, UE 120-1 may transmit information using a reserved resource. For example, based at least in part on transmitting the reservation signal to reserve a resource for communication with UE 120-2, UE 120-1 may transmit information using the reserved resource. As shown by reference number 430', based at least in part on UEs 120-2 through 120-4 not reserving the resources, UEs 120-2 through 120-4 may refrain from transmitting, thereby enabling UE 120-1 to communicate with UE 120-2 without interference. In this case, based at least in part on the channel access frame structure including opportunities to reserve a resource that satisfy a delay requirement, a prioritization, and/or the like, UE 120-1 may transmit the information in accordance with the delay requirement, the prioritization, and/or the like.

As indicated above, FIG. 4 is provided as an example. Other examples may differ from what is described with respect to FIG. 4.

Figure 5:
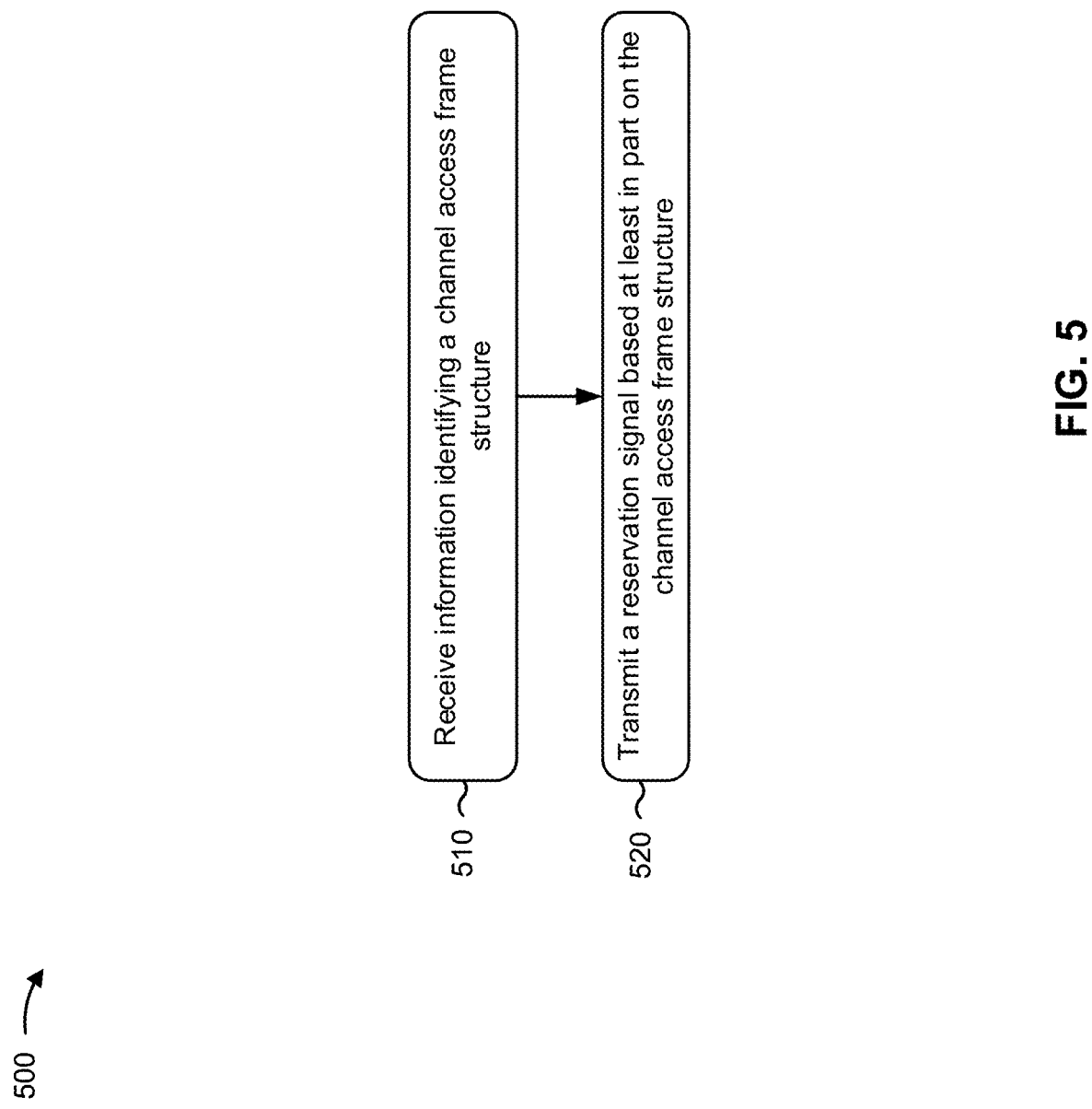
FIG. 5 is a diagram illustrating an example process performed, for example, by a transmitter device, in accordance with various aspects of the present disclosure.

FIG. 5 is a diagram illustrating an example process 500 performed, for example, by a transmitter device, in accordance with various aspects of the present disclosure. Example process 500 is an example where a transmitter device (e.g., UE 120, BS 110, and/or the like) performs operations associated with packet priority handling in device-to-device communication.

As shown in FIG. 5, in some aspects, process 500 may include receiving information identifying a channel access frame structure (block 510). For example, the transmitter device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, for communication in a network, information identifying a plurality of resources associated with prioritization information in a channel access frame structure, as described above.

As further shown in FIG. 5, in some aspects, process 500 may include transmitting a reservation signal based at least in part on the channel access frame structure (block 520). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to a receiver device, a reservation signal using a resource, of the plurality of resources, to indicate use of a subsequent resource for a subsequent transmission based at least in part on the channel access frame structure and a prioritization of the subsequent transmission, as described above.

Process 500 may include additional aspects, such as any single aspect or any combination of aspects described below and/or in connection with one or more other processes described elsewhere herein.

In a first aspect, the reservation signal is a control message.

In a second aspect, alone or in combination with the first aspect, a plurality of transmission time intervals (TTIs) of the channel access frame structure are grouped into a single frame.

In a third aspect, alone or in combination with one or more of the first and second aspects, the plurality of resources of the plurality of TTIs is allocated to each priority class in at least one of a time domain or a frequency domain.

In a fourth aspect, alone or in combination with one or more of the first through third aspects, the transmitter device is configured to select the resource of the plurality of TTIs based at least in part on a random selection procedure.

In a fifth aspect, alone or in combination with one or more of the first through fourth aspects, resources of the plurality of TTIs associated to different priority classes are mutually disjoint.

In a sixth aspect, alone or in combination with one or more of the first through fifth aspects, the resource is at least one resource block (e.g., a set of contiguous resource blocks) in an orthogonal frequency division multiplexing (OFDM) symbol.

In a seventh aspect, alone or in combination with one or more of the first through sixth aspects, the transmitter device is a first UE and the receiver device is a second UE.

In an eighth aspect, alone or in combination with one or more of the first through seventh aspects, the transmitter device is configured to transmit the subsequent transmission based at least in part on transmitting the reservation signal.

In a ninth aspect, alone or in combination with one or more of the first through eighth aspects, each of a plurality of classes of prioritization is assigned a subset of the plurality of resources of the channel access frame structure based at least in part on the prioritization information.

In a tenth aspect, alone or in combination with one or more of the first through ninth aspects, a quantity of resources, for a particular class of a plurality of classes of prioritization, is based at least in part on a quantity of packets associated with the particular class.

In an eleventh aspect, alone or in combination with one or more of the first through tenth aspects, the channel access frame structure is based at least in part on a delay constraint of a packet for transmission using the subsequent resource.

In a twelfth aspect, alone or in combination with one or more of the first through eleventh aspects, a reoccurrence of reservation signal transmission resources in the channel access frame structure for a particular prioritization is based at least in part on a delay constraint of the particular prioritization.

In a thirteenth aspect, alone or in combination with one or more of the first through twelfth aspects, the transmitter device is configured to avoid, for the transmission of the reservation signal, one or more resources allocated for a class of prioritization that is different than a class of prioritization of the transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   receiving, for communication in a network, information identifying a channel access frame structure; and
   transmitting, to a receiver device and in one or more orthogonal frequency division multiplexing (OFDM) symbols of the channel access frame structure, a reservation signal to indicate use of a subsequent resource for a subsequent transmission, wherein an OFDM symbol, of the one or more OFDM symbols, corresponds to a counter value.

2. The method of claim 1, wherein the reservation signal is a control message.

3. The method of claim 1, wherein a plurality of transmission time intervals (TTIs) of the channel access frame structure are grouped into a single frame.

4. The method of claim 3, wherein a plurality of resources of the plurality of TTIs is allocated to each priority class in at least one of a time domain or a frequency domain.

5. The method of claim 4, wherein a first one or more resources, of the plurality of resources of the plurality of TTIs, are associated with a first priority class and a second one or more resources, of the plurality of resources of the plurality of TTIS, are associated with a second, different priority class, and
   wherein the first one or more resources and the second one or more resources are mutually disjoint.

6. The method of claim 1, further comprising:
   selecting the counter value based at least in part on a random selection procedure, and
   selecting the OFDM symbol from the one or more OFDM symbols, based on the counter value.

7. The method of claim 1, wherein the transmitter device is a first UE and the receiver device is a second UE.

8. The method of claim 1, further comprising:
   transmitting the subsequent transmission based at least in part on transmitting the reservation signal.

9. The method of claim 1, wherein each of a plurality of classes of prioritization is assigned a subset of a plurality of resources of the channel access frame structure based at least in part on prioritization information.

10. The method of claim 1, wherein a quantity of resources, for a particular class of a plurality of classes of prioritization, is based at least in part on a quantity of packets associated with the particular class.

11. The method of claim 1, wherein the channel access frame structure is based at least in part on a delay constraint of a packet for transmission using the subsequent resource.

12. The method of claim 1, wherein a reoccurrence of reservation signal transmission resources in the channel access frame structure for a particular prioritization is based at least in part on a delay constraint of the particular prioritization.

13. The method of claim 1, wherein the transmitter device is configured to avoid, for the transmission of the reservation signal, one or more resources allocated for a class of prioritization that is different than a class of prioritization of the transmission.

14. The method of claim 1,
   wherein the counter value is based at least in part on one or more of:
      a priority class of the transmitter device, or
      a delay requirement of the transmitter device.

15. The method of claim 1, wherein the one or more orthogonal frequency division multiplexing (OFDM) symbols include two OFDM symbols.

16. A transmitter device for wireless communication, comprising:
   a memory; and
   one or more processors coupled to the memory, configured to:
      receive, for communication in a network, information identifying a channel access frame structure; and
      transmit, to a receiver device and in one or more orthogonal frequency division multiplexing (OFDM) symbols of the channel access frame structure, a reservation signal to indicate use of a subsequent resource for a subsequent transmission, wherein an OFDM symbol, of the one or more OFDM symbols, corresponds to a counter value.

17. The transmitter device of claim 16, wherein the reservation signal is a control message.

18. The transmitter device of claim 16, wherein a plurality of transmission time intervals (TTIs) of the channel access frame structure are grouped into a single frame.

19. The transmitter device of claim 18, wherein a plurality of resources of the plurality of TTIs is allocated to each priority class in at least one of a time domain or a frequency.

20. The transmitter device of claim 19, wherein a first one or more resources, of the plurality of resources of the plurality of TTIs, are associated with a first priority class and a second one or more resources, of the plurality of resources of the plurality of TTIS, are associated with a second, different priority class, and
   wherein the first one or more resources and the second one or more resources are mutually disjoint.

21. The transmitter device of claim 16, wherein the one or more processors are further configured to:
    select the counter value based at least in part on a random selection procedure, and
    select the OFDM symbol from the one or more OFDM symbols, based on the counter value.

22. The transmitter device of claim 16, wherein the transmitter device is a first UE and the receiver device is a second UE.

23. The transmitter device of claim 16,
    wherein the counter value is based at least in part on one or more of:
        a priority class of the transmitter device, or
        a delay requirement of the transmitter device.

24. The transmitter device of claim 16, wherein the one or more orthogonal frequency division multiplexing (OFDM) symbols include two OFDM symbols.

25. A non-transitory computer-readable medium storing one or more instructions for wireless communication, the one or more instructions comprising:
    one or more instructions that, when executed by one or more processors of a transmitter device, cause the one or more processors to:
        receive, for communication in a network, information identifying a channel access frame structure; and
        transmit, to a receiver device and in one or more orthogonal frequency division multiplexing (OFDM) symbols of the channel access frame structure, a reservation signal to indicate use of a subsequent resource for a subsequent transmission, wherein an OFDM symbol, of the one or more OFDM symbols, corresponds to a counter value.

26. The non-transitory computer-readable medium of claim 25, wherein the reservation signal is a control message.

27. The non-transitory computer-readable medium of claim 25, wherein a plurality of transmission time intervals (TTIs) of the channel access frame structure are grouped into a single frame.

28. The non-transitory computer-readable medium of claim 27, wherein a plurality of resources of the plurality of TTIs is allocated to each priority class in at least one of a time domain or a frequency domain.

29. The non-transitory computer-readable medium of claim 25,
    wherein the counter value is based at least in part on one or more of:
        a priority class of the transmitter device, or
        a delay requirement of the transmitter device.

30. The non-transitory computer-readable medium of claim 25, wherein the one or more orthogonal frequency division multiplexing (OFDM) symbols include two OFDM symbols.

31. An apparatus for wireless communication, comprising:
    means for receiving, for communication in a network, information identifying a channel access frame structure; and
    means for transmitting, to a receiver device and in or more orthogonal frequency division multiplexing (OFDM) symbols of the channel access frame structure, a reservation signal to indicate use of a subsequent resource for a subsequent transmission, wherein an OFDM symbol, of the one or more OFDM symbols, corresponds to a counter value.

32. The apparatus of claim 31, wherein the reservation signal is a control message.

33. The apparatus of claim 31, wherein a plurality of transmission time intervals (TTIs) of the channel access frame structure are grouped into a single frame.

34. The apparatus of claim 33, wherein a plurality of resources of the plurality of TTIs is allocated to each priority class in at least one of a time domain or a frequency domain.

35. The apparatus of claim 31,
    wherein the counter value is based at least in part on one or more of:
        a priority class of the transmitter device, or
        a delay requirement of the transmitter device.

36. The apparatus of claim 31, wherein the one or more orthogonal frequency division multiplexing (OFDM) symbols include two OFDM symbols.

37. The transmitter device of claim 31, further comprising one or more antennas.

* * * * *